United States Patent
Scita

(10) Patent No.: US 7,316,861 B2
(45) Date of Patent: Jan. 8, 2008

(54) BATTERY HOLDING FRAME, IN PARTICULAR FOR AN ELECTRICALLY DRIVEN SWEEPING MACHINE

(75) Inventor: Michele Scita, Fidenza (IT)

(73) Assignee: Dulevo International S.p.A., Parma (IT)

( * ) Notice: Subject to any disclaimer, the term of this patent is extended or adjusted under 35 U.S.C. 154(b) by 406 days.

(21) Appl. No.: 10/853,145

(22) Filed: May 26, 2004

(65) Prior Publication Data

US 2004/0237227 A1    Dec. 2, 2004

(30) Foreign Application Priority Data

May 29, 2003    (IT)    ................ MI20030255 U

(51) Int. Cl.
*H01M 8/00*    (2006.01)

(52) U.S. Cl. .................... 429/96; 429/99; 429/163
(58) Field of Classification Search ............. 414/398, 414/396, 401; 429/96, 99, 163, 178, 177
See application file for complete search history.

(56) References Cited

U.S. PATENT DOCUMENTS

| | | | | |
|---|---|---|---|---|
| 1,935,986 A | * | 11/1933 | Olson | 439/200 |
| 2,303,622 A | * | 12/1942 | Duncan | 429/89 |
| 6,357,070 B1 | | 3/2002 | Vernard et al. | |
| 6,571,542 B1 | * | 6/2003 | Fillman et al. | 56/10.6 |
| 6,989,217 B2 | * | 1/2006 | Suto | 429/178 |

* cited by examiner

*Primary Examiner*—Patrick Joseph Ryan
*Assistant Examiner*—Monique Wills
(74) *Attorney, Agent, or Firm*—Browdy and Neimark, PLLC

(57) ABSTRACT

A battery holding frame is provided for an electrically driven sweeping machine having one lower supporting face (4) for the battery (10), and lateral faces (5) to contain the same battery (10), which include a mobile lateral face (5a) rotatable between a first closed position across the first lower supporting face (4) and a second operating position substantially aligned with and adjacent to the lower supporting face (4) where rotatable elements (7) are provided on the mobile lateral face (5a), suitable for allowing the battery (10) to slide whenever the mobile lateral face (5a) is in an operating position.

15 Claims, 1 Drawing Sheet

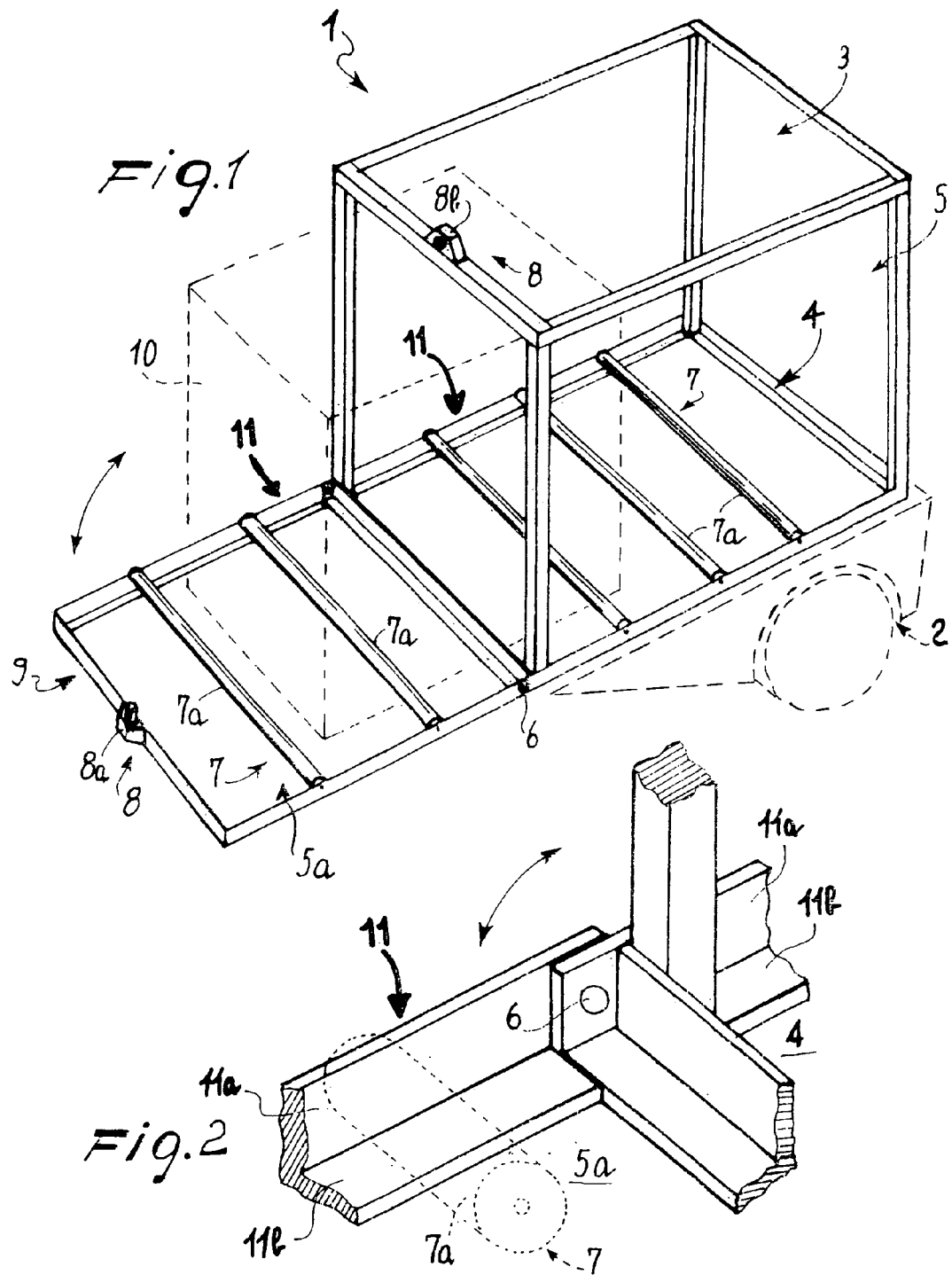

BATTERY HOLDING FRAME, IN PARTICULAR FOR AN ELECTRICALLY DRIVEN SWEEPING MACHINE

FIELD OF THE INVENTION

The invention relates to a battery holding frame, in particular for an electrically driven sweeping machine and comprising at least one lower supporting face for said battery, and laterally containing faces.

DESCRIPTION OF THE PRIOR ART

As known, industrial vehicles suitable for operating in closed spaces, such as in particular sweeping machines operating inside sheds, sales areas, supermarkets etc., are in many cases electrically driven and actuated, in order to avoid the environmental and sound pollution generated by internal combustion motors. The electrical motors of these machines are supplied by batteries or electrical feeders of very heavy weight and very large size, and these are rechargeable to avoid their constant repurchase and also their constant removal for replacement. Under certain circumstances, however, a battery removal is necessary, for instance for a final replacement when exhausted and no longer rechargeable, or whenever, because of the extent of the surfaces to be swept or of the lack of available time, two or more batteries are used in succession, to be subsequently recharged and reused.

The removal of the batteries, even if occasionally, turns out to be cumbersome and fatiguing for the servicing personnel, as it commonly occurs by a topside extraction, after disassembling the machine's appropriate protective parts. Moreover, due to the batteries' considerable weight, their extraction can be performed only by using adequate equipment.

SUMMARY OF THE INVENTION

In this situation, the general aim of this invention is to create a battery holding frame or electrical feeder, in particular for an electrically driven sweeping machine, suitable for substantially overcoming the mentioned drawbacks.

Within the scope of this general aim, an important aim of this invention is to make available a frame suitable for substantially reducing the effort needed for extracting and repositioning the batteries in said vehicles.

Another important aim of the invention is to make available a frame which is simple to use and suitable for substantially reducing the time periods required for extracting and repositioning the batteries in question.

A further aim is to make available a frame of a simple construction, suitable for being mounted on sweeping machines of a new construction, and also such as to be suitable for being replaced on frames installed on already operating machines. The specified aims are achieved by a battery holding frame, in particular for an electrically driven sweeping machine comprising at least one lower supporting face for said battery and lateral containing faces; said lateral containing faces comprising at least one mobile lateral face revolving between a first closed position across said lower supporting face and a second operating position substantially aligned with and adjacent to said lower supporting face; and sliding elements being provided at least on said mobile lateral face, suitable for allowing to slide said battery whenever said mobile lateral face is in said operating position.

BRIEF DESCRIPTION OF THE DRAWINGS

The description of a preferred embodiment of the invention is now given by way of example with reference to the attached drawings, in which:

FIG. 1 shows the structure of the frame as a whole and in perspective, in an open position; and FIG. 2 shows a detailed and again perspective view of a part of the frame shown in the previous figure.

DETAILED DESCRIPTION OF THE PREFERRED EMBODIMENT

With reference to mentioned figures, the frame is indicated as a whole by the number 1 and provided to house a battery 10, in particular on an electrically driven sweeping machine 2.

The frame 1 is substantially shaped as a parallelepiped and comprises an upper covering face or wall 3, a lower supporting face or wall 4 and lateral faces or walls 5.

In particular, a mobile lateral face or wall 5a is provided with respect to the supporting face 4, on which it pivots by hinges or pins 6. Rotatable elements 7 which facilitate sliding a battery 10 in and out of the holding frame are present on the lower face 4 and on the mobile lateral face 5a.

The blocking elements 8 are composed, for example, of an element defined by a screw 8a and an element defined by a nut screw 8b, which can be engaged with each other by simple manual screwing.

In this preferred embodiment, the rotating elements 7 consist of a multiple number of rotating rollers 7a, which can however also be roller bearings or other elements.

The battery 10 of even great size and substantial weight can therefore be easily slid over the extraction plane 9 on rotating elements 7 without equipment.

More in detail, the lower and lateral faces 4, 5 of the frame 1 are defined by metallic angle irons or profiles 11. In practice, the frame is a simple and economical trestle equipped with rotating rollers 7a to support the battery 10.

Moreover, at least the metallic angle irons 11 of the mobile lateral face 5a and of the lower supporting face 4 are exclusively located at edges of the faces themselves which are shaped as squares. Each of the angle irons have a shoulder flap 11a and a bottom flap 11b.

The shoulder flap 11a acts as a lateral edge and the bottom flap 11b acts as a base inside the faces, so as to define, as a whole, pan-like or hollowed seats on which the rotating rollers 7a are engaged so that the tops thereof all lie within a sliding plane 9.

The usage of the frame 1 described above is as follows.

Whenever the mobile lateral face 5a is perpendicular to the lower face 4 and upper face 3, the structure presents a first closed position.

The mobile lateral face 5a in the closed position abuts against the upper face 3 and prevents an eventual sliding of the battery 10, which is placed on the face 4. The blocking elements 8 are provided to guarantee the maintenance of the closed position.

On the other hand, whenever the lateral face 5a is in a position parallel and adjacent to the lower face 4, the structure presents a second operating or open position.

In the open position, the mobile lateral face 5a is substantially aligned with and abuts the lower face 4, so as to form the sliding or extracting plane 9.

The transition from the first closed position to the second open position is substantially a turning over of the mobile lateral face 5a and this turnover is made possible by the hinges or pins 6, once the blocking elements 8 are removed.

The hinges 6 in fact rotatingly constrain the lower face 4 on the mobile lateral face 5a, thus allowing the latter to be moved from the first to the second position.

When the frame 1 is in an open position, the battery 10 may be slid, by simple manual action on the rotating elements 7, toward the outside of the frame.

In this manner the battery 10 is placed in a comfortable position to be loaded on a cart, or to be slid on a transport trolley, or for other operations.

The invention achieves important advantages.

The removal, for instance for replacing, of a battery 10 of an electrically driven sweeping machine 2 does not require detaching the covering face 3, nor uplifting the battery itself. It suffices to reach for the mobile lateral face 5a to turn it over by simple manual actions and then to manually slide the battery 10, on the rotating elements 7, toward the outside of the frame 1.

The structure according to the invention thus substantially reduces the physical efforts of the personnel charged with removing the battery.

A further advantage is provided by reducing the risk of accidents as a result of the efforts previously required for lifting the batteries.

Another important advantage is provided by reducing the dead time for removing and reinstalling the battery, due to the fact that all operations are simple and greatly facilitated.

The invention claimed is:

1. A battery holding frame of an electrically driven sweeping machine, of a type comprising at least one lower supporting face (4) for a battery (10), and laterally containing faces (5);
    said lateral faces (5) comprising at least one mobile lateral face (5a) rotatable between a first closed position across said lower supporting face (4) and a second operating position substantially aligned with and adjacent to said lower supporting face (4);
    and rotatable elements (7) fixed on at least said mobile lateral face (5a), permitting said battery (10) to slide on said rotatable elements onto or out from said lower supporting face when said mobile lateral face (5a) is in said operating position.

2. The battery holding frame according to claim 1, wherein between said mobile lateral face (5a) and said lower supporting face (4) some pins (6) are provided, suitable for rotatingly engaging said faces (4, 5a) with each other.

3. The battery holding frame according to claim 1, wherein said rotatable elements (7) are provided on both said mobile lateral face (5a) and on said lower supporting face (4).

4. The battery holding frame according to claim 3, wherein said rotatable elements (7) consist of rotatable rollers (7a).

5. The battery holding frame according to claim 1, wherein said mobile lateral face (5a) is equipped with blocking elements (8) operable by hand and usable in said closed position.

6. The battery holding frame according to claim 5, wherein said blocking elements (8) comprise a screw (8a) and a nut screw (8b).

7. The battery holding frame according to claim 3, wherein the longitudinal edges of said lower and lateral faces (4, 5) are defined by metallic angle irons (11).

8. The battery holding frame according to claim 7, wherein said metallic angle irons (11) of said lower supporting face (4) and of said mobile lateral face (5a) have a shoulder flap (11a) and a bottom flap (11b), which define seats on which said rotatable elements (7) are engaged.

9. A battery holding frame of an electrically driven sweeping machine, of a type comprising at least one lower supporting face (4) for a battery (10), and laterally containing faces (5);
    said lateral faces (5) comprising at least one mobile lateral face (5a) rotatable between a first closed position across said lower supporting face (4) and a second operating position substantially aligned with and adjacent to said lower supporting face (4);
    and rotatable elements (7) fixed on at least said mobile lateral face (5a) and said lower supporting face (4) so as to permit said battery (10) to slide on said rotatable elements from said mobile lateral face (5a) onto said lower supporting face when said mobile lateral face (5a) is in said operating position;
    wherein the longitudinal edges of said lower and lateral faces (4, 5) are defined by metallic angle irons (11); and
    wherein said metallic angle irons (11) of said lower supporting face (4) and of said mobile lateral face (5a) have a shoulder flap (11a) and a bottom flap (11b), which define seats on which said rotatable elements (7) are engaged.

10. The battery holding frame according to claim 9, wherein between said mobile lateral face (5a) and said lower supporting face (4) some pins (6) are provided, suitable for rotatingly engaging said faces (4, 5a) with each other.

11. The battery holding frame according to claim 9, wherein said rotatable elements (7) consist of rotatable rollers (7a).

12. The battery holding frame according to claim 9, wherein said mobile lateral face (5a) is equipped with blocking elements (8) operable by hand and usable in said closed position.

13. The battery holding frame according to claim 12, wherein said blocking elements (8) comprise a screw (8a) and a nut screw (8b).

14. The battery holding frame according to claim 4, wherein when in the second operating position, the top of each of said rotatable rollers lie in a sliding plane (9).

15. The battery holding frame according to claim 9, wherein when in the second operating position, the top of each of said rotatable rollers lie in a sliding plane (9).

* * * * *